(12) United States Patent
Lee et al.

(10) Patent No.: US 10,036,918 B2
(45) Date of Patent: Jul. 31, 2018

(54) LIGHT UNIT AND DISPLAY DEVICE INCLUDING THE SAME

(71) Applicant: Samsung Display Co., Ltd., Yongin, Gyeonggi-Do (KR)

(72) Inventors: Seon Uk Lee, Seongnam-si (KR); Nam Seok Roh, Seongnam-si (KR); Woo Jae Lee, Yongin-si (KR); Hee-Keun Lee, Suwon-si (KR); Don Chan Cho, Seongnam-si (KR)

(73) Assignee: Samsung Display Co., ltd. (KR)

( * ) Notice: Subject to any disclaimer, the term of this patent is extended or adjusted under 35 U.S.C. 154(b) by 104 days.

(21) Appl. No.: 14/595,076

(22) Filed: Jan. 12, 2015

(65) Prior Publication Data
US 2015/0219963 A1 Aug. 6, 2015

(30) Foreign Application Priority Data
Feb. 6, 2014 (KR) .................. 10-2014-0013726

(51) Int. Cl.
*G02F 1/1335* (2006.01)
*G02B 5/02* (2006.01)

(52) U.S. Cl.
CPC .. *G02F 1/133606* (2013.01); *G02F 1/133602* (2013.01); *G02B 5/0278* (2013.01)

(58) Field of Classification Search
CPC ......... G02F 1/133606; G02F 1/133602; G02B 5/02; G02B 5/0278
USPC .......................................................... 349/61
See application file for complete search history.

(56) References Cited

U.S. PATENT DOCUMENTS

| | | | |
|---|---|---|---|
| 7,710,370 B2 | 5/2010 | Slikkerveer et al. | |
| 7,722,245 B2 | 5/2010 | Baba et al. | |
| 7,961,182 B2 | 6/2011 | Tachi et al. | |
| 8,477,271 B2 | 7/2013 | Enomoto | |
| 9,476,571 B2* | 10/2016 | Takatori | F21V 3/049 |
| 2005/0017623 A1* | 1/2005 | Yamamoto | G02F 1/133604 313/234 |
| 2007/0018185 A1* | 1/2007 | Hung | G02B 6/0001 257/98 |
| 2007/0103545 A1 | 5/2007 | Listig et al. | |
| 2009/0196069 A1* | 8/2009 | Iwasaki | G02B 6/0041 362/613 |
| 2010/0053977 A1* | 3/2010 | Chen | F21V 7/005 362/310 |
| 2012/0155083 A1* | 6/2012 | Sato | G02B 6/0021 362/241 |
| 2013/0114027 A1* | 5/2013 | Hasegawa | G02B 5/305 349/96 |
| 2013/0180653 A1 | 7/2013 | Kim et al. | |
| 2014/0092620 A1* | 4/2014 | Tissot | G02B 6/0003 362/553 |

FOREIGN PATENT DOCUMENTS

| | | |
|---|---|---|
| JP | 2000-206903 | 7/2000 |
| JP | 2007-072375 | 3/2007 |
| KR | 20-0338028 | 12/2003 |
| KR | 10-2012-0026880 | 3/2012 |

* cited by examiner

*Primary Examiner* — Charles Chang
(74) *Attorney, Agent, or Firm* — Innovation Counsel LLP

(57) ABSTRACT

The inventive concept relates to a light unit and a diffuser separated from the light source at a predetermined distance and having a cylindrical structure, and a cylindrical structure display device including the same.

16 Claims, 12 Drawing Sheets

LIGHT UNIT AND DISPLAY DEVICE INCLUDING THE SAME

CROSS-REFERENCE TO RELATED APPLICATION

This application claims priority to and the benefit of Korean Patent Application No. 10-2014-0013726 filed in the Korean Intellectual Property Office on Feb. 6, 2014, the entire contents of which are incorporated herein by reference.

BACKGROUND (a) Field

The inventive concept relates to a light unit and a display device including the same, and in detail, relates to a light unit with a cylindrical structure and a cylindrical structure display device including the same.

(b) Description of the Related Art

A liquid crystal display as one of flat panel display devices that are being widely used includes two display panels where field generating electrodes such as a pixel electrode and a common electrode are formed, and a liquid crystal layer is interposed therebetween. The liquid crystal display generates an electric field in a liquid crystal layer by applying a voltage to the field generating electrodes, to determine orientations of liquid crystal molecules of the liquid crystal layer and control polarization of incident light, thereby displaying an image.

The liquid crystal display is a non-self-emissive display device such that a light unit is required. That is, the light provided from the light unit is altered to display predetermined images having gray scales. There are various non-self-emissive display devices including the liquid crystal display.

Generally, the light unit used in the non-self-emissive display device has a planar structure, and the light provided from the light unit is provided through a top surface of the light unit. The top surface of the light unit has the planar structure such that the planar light is provided from the light unit to the non-self-emissive display.

The above information disclosed in this Background section is only for enhancement of understanding of the background of the inventive concept and therefore it may contain information that does not constitute prior arts.

SUMMARY

The inventive concept provides a light unit providing light to a cylindrical surface, and a display device including the same.

A light unit according to an exemplary embodiment of the inventive concept includes a light source, and a diffuser separated from the light source at a predetermined distance and having a cylindrical structure. The diffuser may surround the light source The light source may be disposed along a center of the cylindrical structure.

At least one optical sheet disposed along an outer surface of the diffuser may be further included.

A horizontal distance from the light source to the diffuser may not be uniform.

A light unit according to an exemplary embodiment of the inventive concept includes a light source having a cylindrical configuration, wherein the cylindrical light source having an empty center portion, a cylindrical inner surface and a cylindrical outer surface, and a diffuser positioned along the cylindrical outer surface of the light source.

A reflector positioned along the cylindrical inner surface of the light source may be further included. The reflector may have a cylindrical inner surface and a cylindrical outer surface At least one optical sheet disposed along the cylindrical outer surface of the diffuser may be further included.

A display device according to an exemplary embodiment of the inventive concept includes: a display panel; and a light unit providing a light to the display panel, wherein the light unit includes a light source, and a diffuser separated from the light source at a predetermined distance and having a cylindrical structure. The diffuser may surround the light source.

The display panel may have a cylindrical configuration

The light source may be disposed along a center of the cylindrical structure.

At least one optical sheet disposed along an outer surface of the diffuser may be further included.

A horizontal distance from the light source to the diffuser may not be uniform.

The display panel may include a plurality of pixels, and each pixel may include a liquid crystal layer disposed in a microcavity.

An adhesive adhering the display panel and the light unit may be further included.

A display device according to an exemplary embodiment of the inventive concept includes: a display panel; and a light unit providing light to the display panel, wherein the light unit includes a light source having a cylindrical configuration, wherein the cylindrical light source having an empty center portion, a cylindrical inner surface and a cylindrical outer surface, and a diffuser positioned along the cylindrical outer surface of the light source. The display panel may have a cylindrical configuration A reflector positioned along the cylindrical inner surface of the light source may be further included. The reflector may have a cylindrical inner surface and a cylindrical outer surface.

At least one optical sheet disposed along the cylindrical outer surface of the diffuser may be further included.

The display panel may include a plurality of pixels, and each pixel includes a liquid crystal layer disposed in a microcavity.

An adhesive adhering the display panel and the light unit may be further included.

As described above, the cylindrical light unit providing the light of the cylinder surface is provided thereby providing the cylindrical display device. When using the cylindrical display device, there is a merit recognizing the display device in all directions.

DETAILED DESCRIPTION OF THE EMBODIMENTS

Figure 1:
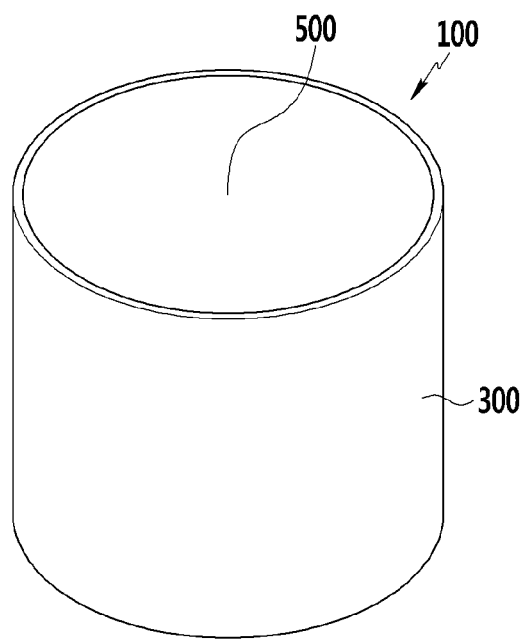
FIG. 1 is a schematic perspective view of a display device according to an exemplary embodiment of the inventive concept.

The inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be formed directly on the other element or it can be formed with intervening elements. In contrast, when an element is referred to as being "directly on" another element, there are no intervening elements present.

Now, a display device according to an exemplary embodiment of the inventive concept will be described with reference to FIG. 1.

FIG. 1 is a schematic perspective view of a display device according to an exemplary embodiment of the inventive concept.

The display device 100 according to an exemplary embodiment of the inventive concept includes a display panel 300 and a light unit 500. The display device 100 according to an exemplary embodiment of the inventive concept has a cylindrical structure thereby displaying an image through a surface that is bent into a cylindrical shape. The light unit 500 of the display device 100 may have a cylindrical structure, the display panel 300 is disposed around the light unit 500, and the display panel 300 has a cylindrical structure. A center of the display panel is empty. The light unit 500 has the cylindrical structure and emits the light from the side surface of the cylindrical structure toward the display panel 300. The display panel 300 displays the image by using the light provided from the light unit 500. The non-self-emissive display panel 300 may be a liquid crystal panel, an electrophoretic display panel, an electrowetting display panel or a microshutter display panel. The display panel 300 may be a liquid crystal panel that is described in FIG. 10 to FIG. 12, and may have a structure in which a liquid crystal in the liquid crystal panel is disposed in a microcavity.

Next, the display device 100 according to an exemplary embodiment of the inventive concept will be described in detail with reference to FIG. 2 and FIG. 3.

Figure 2:
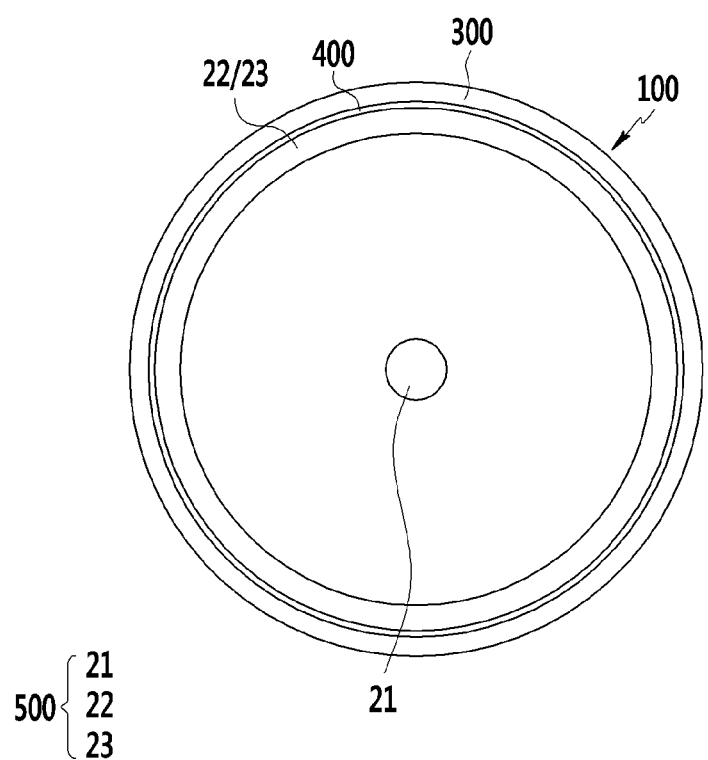
FIG. 2 is a cross-sectional view of the display device according to the exemplary embodiment of FIG. 1.
Figure 3:
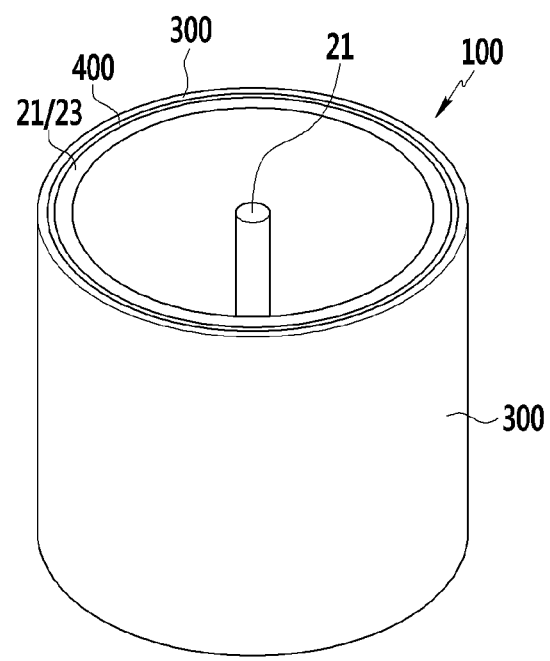
FIG. 3 is a perspective view of the display device according to the exemplary embodiment of FIG. 1.

FIG. 2 is a cross-sectional view of the display device according to the exemplary embodiment of FIG. 1, and FIG. 3 is a perspective view of the display device according to the exemplary embodiment of FIG. 1.

In FIG. 2 and FIG. 3, the light unit 500 is shown in detail.

The light unit 500 having the cylindrical structure according to an exemplary embodiment of the inventive concept includes a light source 21, a diffuser 22, and an optical sheet 23. The light source 21 is a linear light source elongated along the center of the cylindrical structure, and may be a fluorescent light source such as a CCFL or at least one light emitting diode (LED).

The fluorescent light source emits light to the inner surface of the display panel 300. Instead, a plurality of light emitting diodes (LED) may be arranged along the center of the cylindrical structure such that the light emitting diodes (LED) may emit light to the inner surface of the display panel 300. The plurality of light emitting diodes (LED) may be a column of the light emitting diodes (LEDs) arranged on a PCB.

The diffuser 22 may be disposed at a position away from the light source 21 by a predetermined distance. The diffuser 22 may be disposed on the inner surface of the display panel 300 having a predetermined distance with respect to the center of the light source 21.

At least one optical sheet 23 may be disposed between the diffuser 22 and the display panel 300. The optical sheet 23 may include a prism sheet in which a prism is formed at a surface thereof, at least one of luminance improving films of which at least two layers having different refractive indexes are repeatedly and alternately disposed, and other various optical sheets. According to another exemplary embodiment, the optical sheet 23 may be omitted. In FIG. 2 and FIG. 3, the optical sheet 23 and the diffuser 22 are disclosed as one layer, however, the diffuser 22 and the optical sheet 23 may be separate components. The diffuser 22 may be positioned at the inner or outer surface of the optical sheet 23.

The diffuser 22 may have a thickness of about 5 mm and the optical sheet 23 may be supported by the diffuser 22.

The diffuser 22 and the optical sheet 23 included in the light unit 500 may be attached to the display panel 300 by an adhesive 400. According to FIG. 2 and FIG. 3, the optical sheet 23 of the light unit 500 is adhered to the display panel 300 by the adhesive 400.

According to the exemplary embodiment, the light unit 500 and the display panel 300 may be fixed by using an additional mold frame. In this case, the adhesive 400 may be omitted.

Figure 4:
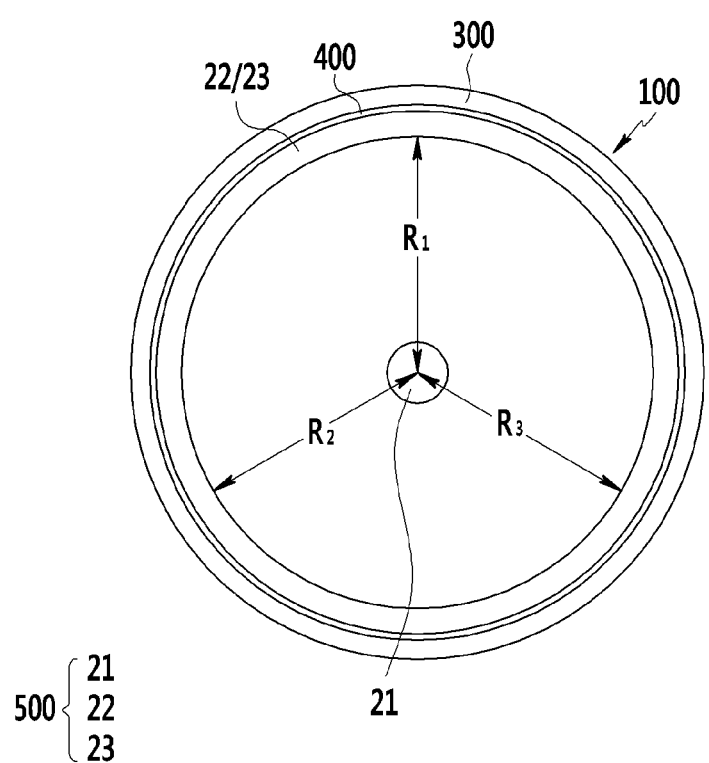
FIG. 4 is a cross-sectional view of a display device according to an exemplary embodiment of the inventive concept.

In FIG. 4, an exemplary variation of the light unit 500 and the display device 100 of FIG. 1 will be described.

FIG. 4 is a cross-sectional view of a display device according to an exemplary embodiment of the inventive concept.

In FIG. 4, the light unit 500 and the display panel 300 having the cylindrical structure are shown.

FIG. 1 shows the cylindrical structure in which the light source 21 is positioned at the center of the display device 100, however FIG. 4 shows an exemplary embodiment in which a horizontal distance from the light source 21 to the diffuser 22 is not uniform.

That is, in the exemplary embodiment of FIG. 2, the light source 21 is positioned at the center such that the distance from the light source 21 to any portion of the diffuser 22 is uniform. Also, the distance between the light source 21 and any one the optical sheet 23 and the display panel 300 is uniform.

However, according to an exemplary embodiment as shown in FIG. 4, the position of the light source 21 may be off-centered, or a structure may have a curved surface having different distances from the center.

In this case, an optical characteristic may be changed according to a viewing position of the display device 100. However, the display device 100 having the off-centered light source or the curved surface may have an advantage that the image may be easily recognized at a certain viewing point.

In FIG. 4, if R1, R2, and R3 are the same, the embodiment corresponds to the exemplary embodiment of FIG. 2.

Hereafter, a reason that the diffuser 22 is included in the light unit 500 will be described with reference to FIG. 5.

Figure 5:
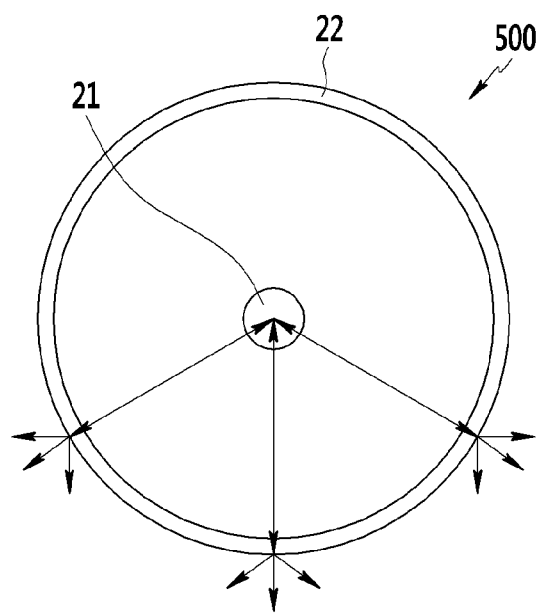
FIG. 5 is a view showing a characteristic of a diffuser in a light unit according to an exemplary embodiment of the inventive concept.

FIG. 5 is a view showing a characteristic of a diffuser in a light unit according to an exemplary embodiment of the inventive concept.

FIG. 5 only shows the light source 21 and the diffuser 22 among the light unit 500.

The light source 21 is the surface light source which emits the light through the cylinder surface enclosing the light source 21. That is, a direction that the light is emitted is perpendicular to the diffuser. This direction is shown through an arrow formed from the light source 21 to the diffuser 22 in FIG. 5. The diffuser 22 is used to diffuse the light from the light source 21 into various directions. That is, the diffuser 22 has a characteristic of scattering the light such that the light provided from the light source 21 is scattered in the various directions. This is shown by arrows from the diffuser 22 toward the outside of the diffuser 22 in FIG. 5.

Through the diffuser 22, the light provided from the light source 21 may be uniformly distributed to all directions, thus, the light intensity may be uniform at all positions.

The light passing through the diffuser 22 is transmitted to eyes of a viewer through the optical sheet 23 and the display panel 300, and the viewer may recognize the image displayed by the display device 100 in the various directions. As a result, a viewing angle, an angle in which the image of the display device 100 can be recognized, is increased.

Next, the light unit 500 according to another exemplary embodiment of the inventive concept will be described with reference to FIG. 6 to FIG. 8.

Figure 6:
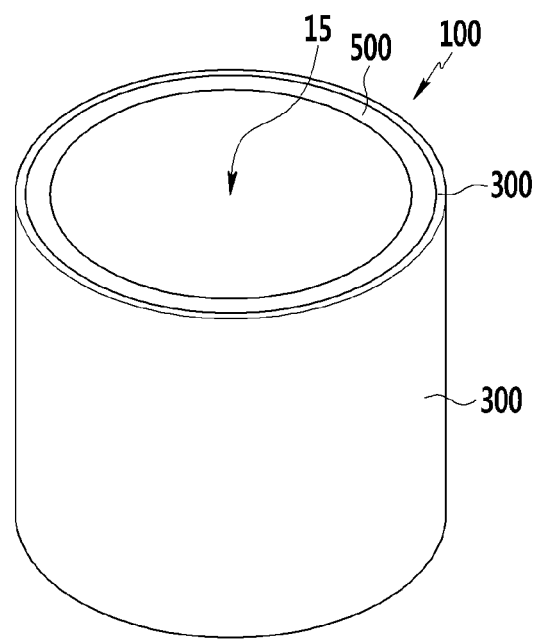
FIG. 6 is a schematic perspective view of a display device according to another exemplary embodiment of the inventive concept.
Figure 7:
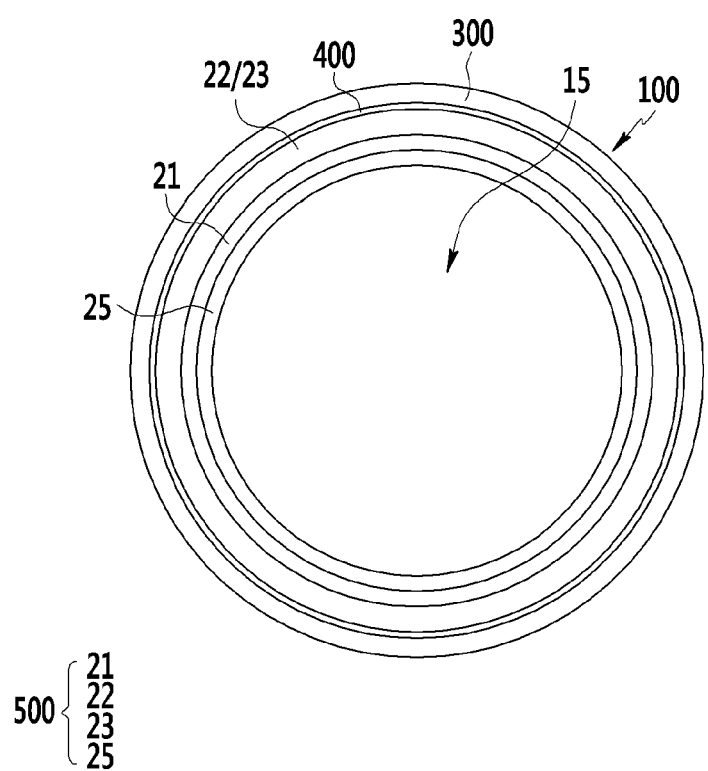
FIG. 7 is a cross-sectional view of the display device according to the exemplary embodiment of FIG. 6.
Figure 8:
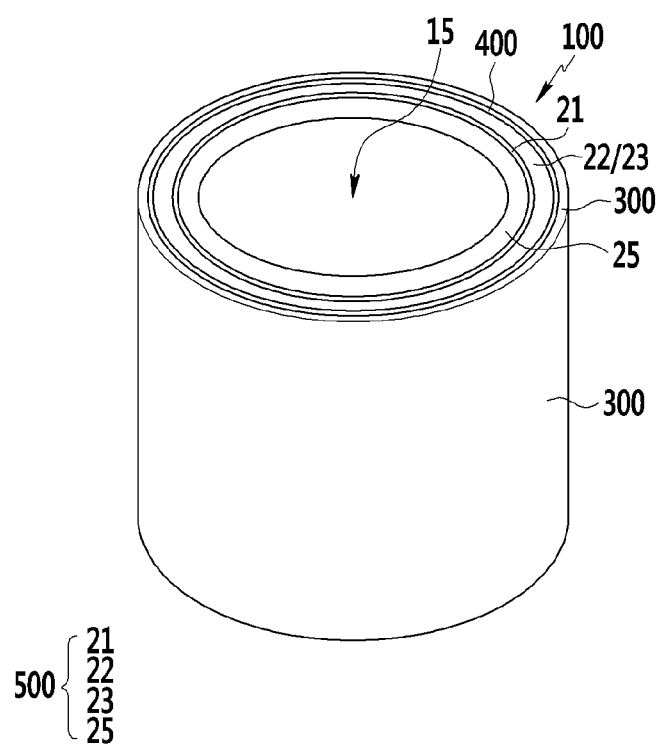
FIG. 8 is a perspective view of the display device according to the exemplary embodiment of FIG. 6.

The light unit 500 in FIG. 6 to FIG. 8 has a structure different from the embodiment of FIG. 1. in that the light unit 500 in FIG. 6 to FIG. 8 has the cylindrical structure and the center of the light unit 500 is empty.

Firstly, the schematic structure of the display device 100 will be described with reference to FIG. 6.

FIG. 6 is a schematic perspective view of a display device according to another exemplary embodiment of the inventive concept.

The display device 100 according to the exemplary embodiment of FIG. 6 includes the display panel 300 and the light unit 500. The display device 100 according to an exemplary embodiment of the inventive concept has a cylindrical structure having an empty center portion. That is, the light unit 500 of the display device 100 is formed of the cylindrical structure in which the center is empty, the display panel 300 is positioned outside the side surface of the light unit 500, and the display panel 300 has the cylindrical structure in which the center is empty. The light unit 500 includes an opening 15 having a predetermined diameter. The center of the light unit 500 is empty, thereby emitting the light toward an inner and outer side surface of the cylindrical light unit. The light unit 500 is one kind of a planar light source and emits the light along the inner and outer side surface of the cylinder.

The display panel 300 displays the image by using the light provided from the light unit 500. The non-self-emissive display panel 300 may be a liquid crystal panel, an electrophoretic display panel, an electrowetting display panel, or a microshutter display panel. When the display panel 300 is the liquid crystal panel, the display panel 300 may be a liquid crystal panel that is described later in FIG. 10 to FIG. 12, and may have a structure in which a liquid crystal in the liquid crystal panel is positioned in a microcavity.

Next, the display device 100 according to an exemplary embodiment of the inventive concept will be described with reference to FIG. 7 and FIG. 8.

FIG. 7 is a cross-sectional view of the display device according to the exemplary embodiment of FIG. 6, and FIG. 8 is a perspective view of the display device according to the exemplary embodiment of FIG. 6.

In FIG. 7 and FIG. 8, the light unit 500 of FIG. 6 is shown in detail.

The light unit 500 having the cylindrical structure of which the center is empty according to an exemplary embodiment of the present invention includes a light source 21, a diffuser 22, an optical sheet 23, and a reflector 25. The light source 21 is a cylinder surface light source formed of the curved surface along the cylindrical surface. This surface light source may include a plurality of fluorescent light sources such as the CCFL, and may be formed by using a plurality of light emitting diodes (LEDs). In this case, the plurality of light emitting diodes (LEDs) or florescent light sources may be arranged along the cylindrical surface of the light unit 500. Also, a plurality of LED bars having light emitting diodes (LEDs) arranged in one direction may be used.

The diffuser 22 may be positioned at the outer surface of the light source 21. The diffuser 22 has a function of dispersing the light provided from the light source 21 as shown in FIG. 5.

At least one optical sheet 23 may be disposed between the diffuser 22 and the display panel 300. The optical sheet 23 may include a prism sheet in which a prism is formed at a surface thereof, at least one of luminance improving films of which at least two layers having different refractive indexes are repeatedly and alternately disposed, and other various optical sheets. According to another exemplary embodiment, the optical sheet 23 may be omitted. In FIG. 7 and FIG. 8, the optical sheet 23 and the diffuser 22 are disclosed as one layer, however, the diffuser 22 and the optical sheet 23 may be separate components. The diffuser 22 may be positioned at the inner or the outer surface of the optical sheet 23 according to an exemplary embodiment.

The diffuser 22 may have a thickness of about 5 mm, and the reflector 25, the light source 21, and the optical sheet 23 may be attached on the diffuser and supported by the diffuser 22.

The reflector 25 is positioned at an inner surface of the light source 21. The reflector 25 also has the cylindrical structure of which the center is empty, and has a function of reflecting the light emitted from the light source 21 toward the center of the cylindrical structure, thus, improve the light efficiency. When the structure of the light source 21 is structured so as to reflect the light from the light soured 21 toward the inside of the cylindrical structure, the reflector 25 may not be separately included.

The light unit 500 including the reflector 25, the diffuser 22 and the optical sheet 23 may be attached to the display panel 300 by an adhesive 400. According to FIG. 7 and FIG. 8, the optical sheet 23 of the light unit 500 is adhered to the display panel 300 by the adhesive 400.

According to the exemplary embodiment, the light unit 500 and the display panel 300 may be fixed by using an additional mold frame. In this case, the adhesive 400 may be omitted.

Next, a configuration of the light unit 500 will be described with reference to FIG. 9.

Figure 9:
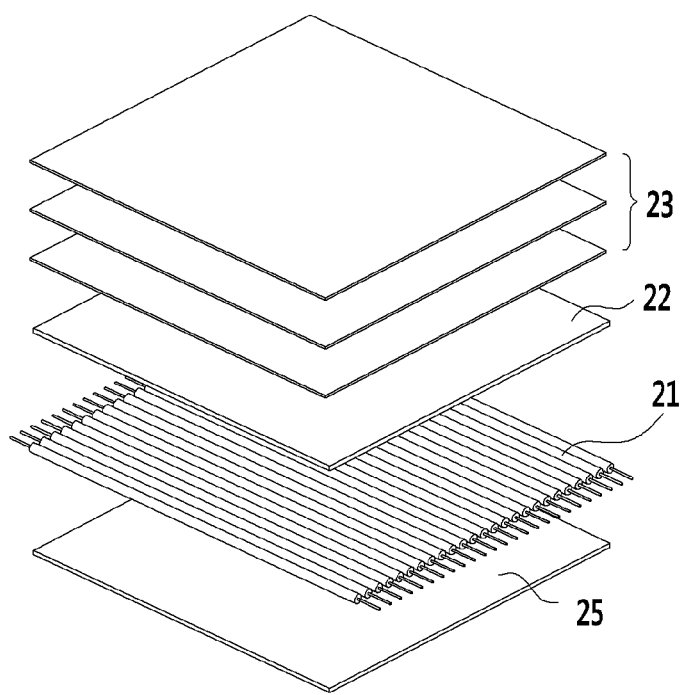
FIG. 9 is a view showing a position relationship of constituent elements of a light unit.

FIG. 9 shows a configuration of constituent elements of the light unit.

In FIG. 9, each element has a flat surface. However, as disclose in the previous exemplary embodiments, each element may have a cylindrical configuration The light unit 500 according to an exemplary embodiment of the inventive concept includes the light source 21, the diffuser 22, the optical sheet 23, and the reflector 25.

In FIG. 9, the light source 21 includes a plurality of florescent light sources such as the CCFL. If the light source shown in FIG. 9 is arranged along the cylinder surface, it is used as the light source 21 of FIG. 6.

The reflector 25 is positioned at the inner surface of the light source 21. The reflector 25 has the function of reflecting the light emitted from the light source 21 to the display panel (not shown) to improve the efficiency of light source 21.

The diffuser 22 is positioned at the outer surface of the light source 21. The diffuser 22 has the function of dispersing the light provided from the light source 21.

At least one optical sheet 23 is positioned at the outer surface of the diffuser 22. The optical sheet 23 may include a prism sheet in which a prism is formed at a surface thereof, at least two luminance improving films in which two layers having different refractive indexes are repeatedly and alternately disposed, and other various optical sheets. According to an exemplary embodiment, two prism sheets may be used, and the two prism sheets may have extending directions of the prism thereof perpendicular to each other.

In the above, the structure of the light unit 500 was described.

Next, one structure among various structures of the display panel 300 will be described.

In general, when forming the liquid crystal panel with the curved surface, the upper substrate and the lower substrate may be misaligned due to a difference in radius of curvature such that display quality may be deteriorated.

Figure 10:
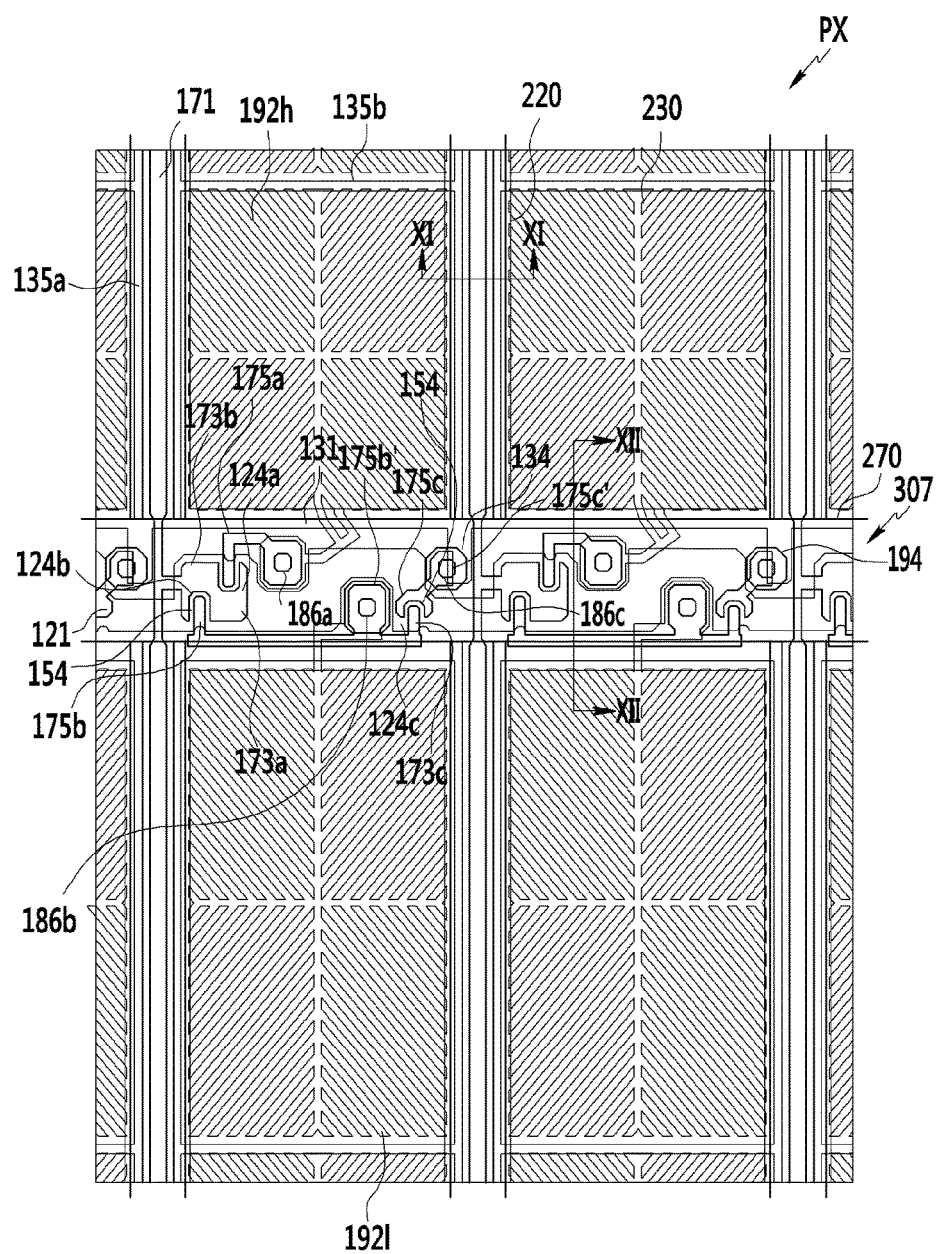
FIG. 10, FIG. 11 and FIG. 12 are views showing one example of a display panel according to an exemplary embodiment of the inventive concept.
Figure 11:
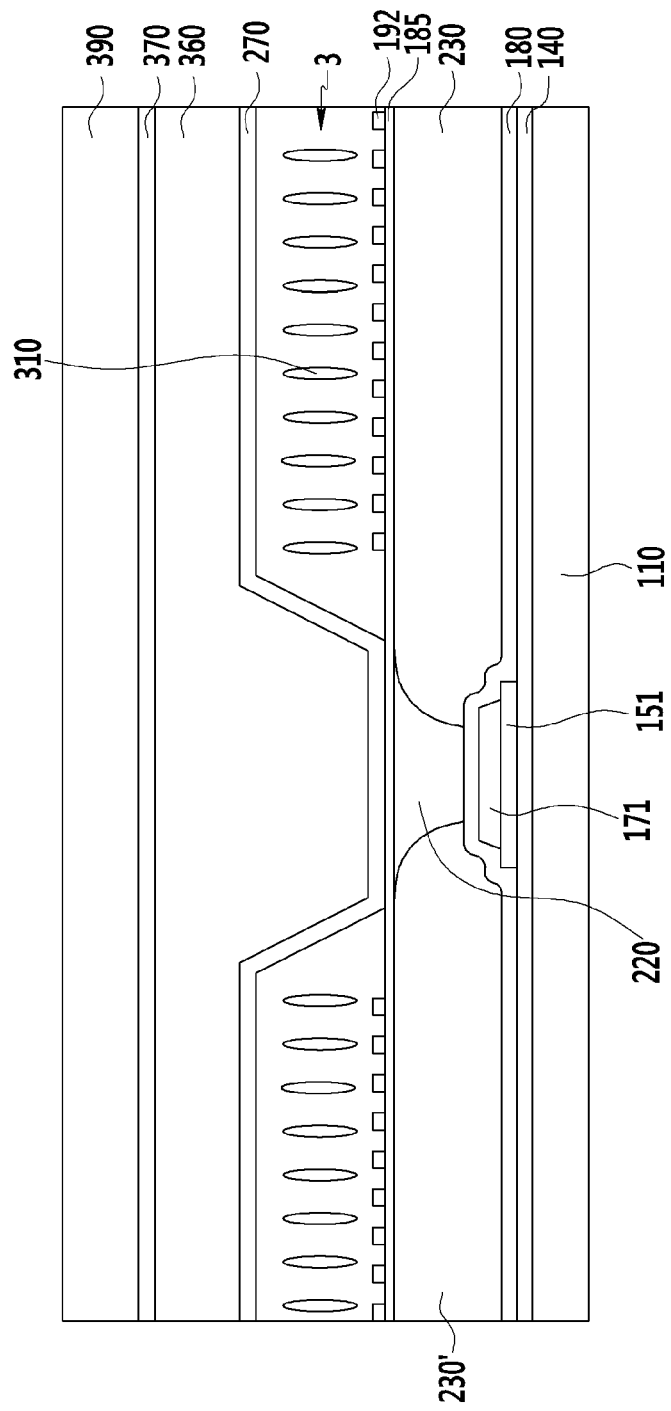
Figure 12:
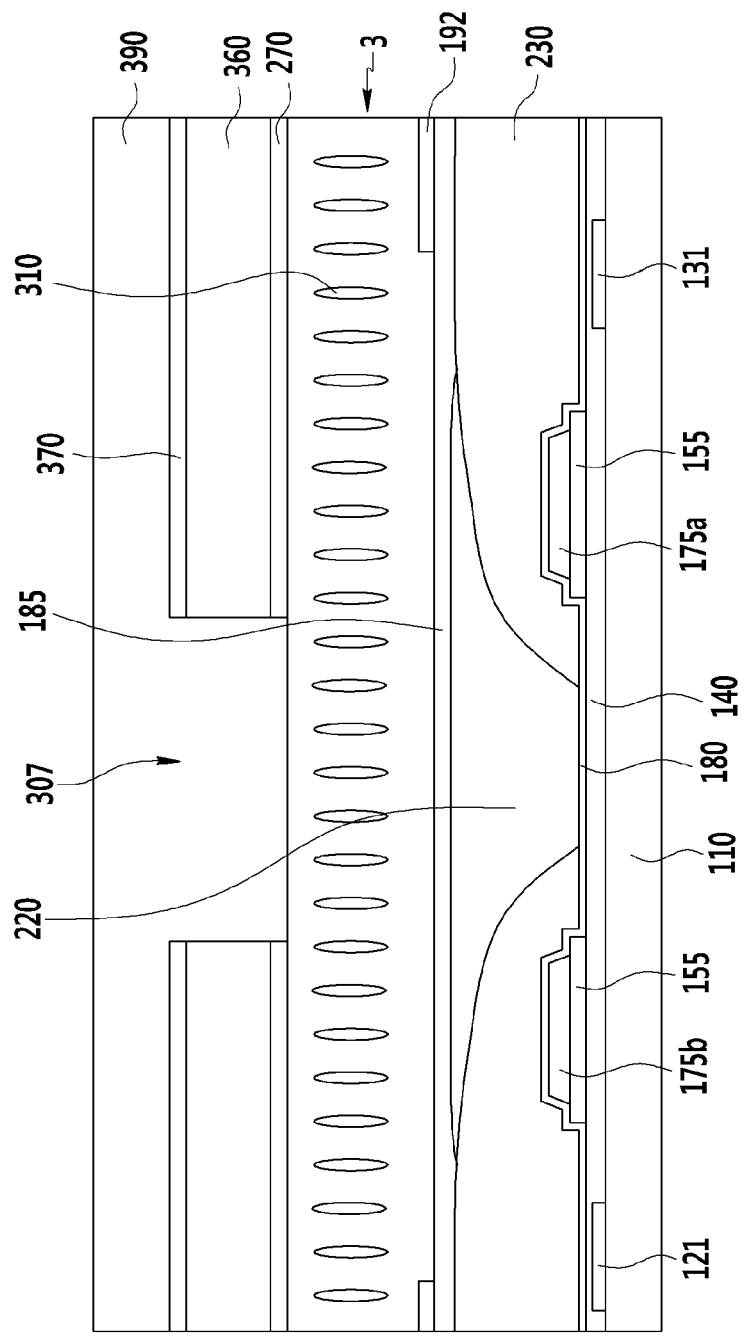

However, when the liquid crystal layer is positioned in a microcavity as shown in FIG. 10 to FIG. 12, only one substrate is used to form the liquid crystal display such that a misalignment of the upper substrate and the lower substrate can be eliminated, thus, characteristic change of the display due to the curved surface and the deterioration of the display quality may be prevented.

Hereafter, a structure of the liquid crystal panel 300 in which the liquid crystal layer is formed in the microcavity for each pixel according to an exemplary embodiment will be described with reference to FIG. 10 to FIG. 12.

FIG. 10 to FIG. 12 are views showing one example of a display panel according to an exemplary embodiment of the inventive concept.

FIG. 10 is a layout view of one pixel PX in the liquid crystal panel 300 according to an exemplary embodiment of the inventive concept, FIG. 11 is a cross-sectional view taken along a line XI-XI of FIG. 10, and FIG. 12 is a cross-sectional view taken along a line XII-XII of FIG. 10.

A gate line 121 and a storage voltage line 131 are formed on an insulating substrate 110 formed of transparent glass or plastic. The gate line 121 includes a first gate electrode 124a, a second gate electrode 124b, and a third gate electrode 124c. The storage voltage line 131 includes storage electrodes 135a and 135b, and a protrusion 134 protruding in a direction of the gate line 121. The storage electrodes 135a and 135b have a structure surrounding a first subpixel electrode 192h and a second subpixel electrode 192l. A horizontal portion of the storage electrode 135b of FIG. 10 may be one wire which is not separated from a horizontal portion of the storage electrode 135b of the previous pixel.

A gate insulating layer 140 is formed on the gate line 121 and the storage voltage line 131. A semiconductor 151 positioned on a lower portion of a data line 171, a semiconductor 155 positioned on lower portions of source/drain electrodes, and a semiconductor 154 positioned in a channel portion of a thin film transistor are formed on the gate insulating layer 140.

A plurality of ohmic contacts may be formed on each of the semiconductors, 151, 154, and 155, and between the semiconductors 151, 154, and 155 and the data line 171 and the source/drain electrodes, and are omitted in the drawings.

The plurality of data lines 171 including a first source electrode 173a and a second source electrode 173b, data conductors 171, 173c, 175a, 175b, and 175c including a first drain electrode 175a, a second drain electrode 175b, a third source electrode 173c, and a third drain electrode 175c are formed on each of the semiconductors 151, 154, and 155 and the gate insulating layer 140.

The first gate electrode 124a, the first source electrode 173a, and the first drain electrode 175a form a first thin film transistor Qa together with the semiconductor 154, and a channel of the thin film transistor is formed at the semiconductor 154 between the first source electrode 173a and the first drain electrode 175a. Similarly, the second gate electrode 124b, the second source electrode 173b, and the second drain electrode 175b form a second thin film transistor Qb together with the semiconductor 154, the channel of the thin film transistor is formed in the semiconductor 154 between the second source electrode 173b and the second drain electrode 175b, the third gate electrode 124c, the third source electrode 173c, and the third drain electrode 175c form a third thin film transistor Qc together with the semiconductor 154, and the channel of the thin film transistor is formed in the semiconductor 154 between the third source electrode 173c and the third drain electrode 175c.

The data line 171 of the exemplary embodiment of the inventive concept has a structure in which a width thereof is decreased in the thin film transistor formed region around an expanded portion 175c' of the third drain electrode 175c. The structure is for the purpose of maintaining an interval from an adjacent wire and decreasing signal interference, but is not essentially formed in this manner.

A first passivation layer 180 is formed on the data conductors 171, 173c, 175a, 175b, and 175c, and the exposed semiconductor portion 154. The first passivation layer 180 may include an inorganic insulation material, such as a silicon oxynitride (SiOxNy), a silicon nitride (SiNx) and a silicon oxide (SiOx), or an organic insulation material.

A color filter 230 is formed on the passivation layer 180. Pixels adjacent in the vertical direction (data line direction) include color filters 230 having the same color. Furthermore, pixels adjacent in the horizontal direction (gate line direction) include color filters 230 and 230' having different colors, and the two color filters 230 and 230' may overlap each other over the data line 171. Each of the color filters 230 and 230' may display one of three primary colors of red, green, and blue. However, the color filter is not limited to the three primary colors of red, green, and blue, and may display one of cyan, magenta, yellow, and white-based color.

A light blocking member (black matrix: 220) is formed over the color filters 230 and 230'. The light blocking member 220 is formed around a region where the gate line 121, the storage voltage line 131, and the thin film transistor are formed (hereafter referred to as "transistor formation region") and a region where the data line 171 is formed, and has a lattice structure having an opening corresponding to a region for displaying an image. The color filter 230 is formed in the opening of the light blocking member 220. Also, the light blocking member 220 is formed of a material through which light cannot be transmitted.

A second passivation layer 185 is formed over the color filter 230 and the light blocking member 220 so as to cover the color filter 230 and the light blocking member 220. The second passivation layer 185 may include an inorganic insulator, such as a silicon nitride (SiNx), a silicon oxide (SiOx), and a silicon oxynitride (SiOxNy), or an organic insulator. When a step occurs due to a thickness difference between the color filter 230 and the black matrix 220, unlike the structure illustrated in FIG. 11 and FIG. 12, the second passivation layer 185 may be formed of an organic insulator to reduce or remove the step.

The color filter 230, the black matrix 220, and the passivation layers 180 and 185 have first and second contact holes 186a and 186b formed to expose the first drain electrode 175a and an extension 175b' of the second drain electrode 175b, respectively. Furthermore, the color filter 230, the black matrix 220, and the passivation layers 180 and 185 have a third contact hole 186c formed to expose the protrusion 134 of the storage voltage line 131 and the extension 175c' of the third drain electrode 175c.

In the present exemplary embodiment, the black matrix 220 and the color filter 230 also have the contact holes 186a, 186b, and 186c formed therein. However, depending on the materials of the black matrix 220 and the color filter 230, an etching process for forming the contact holes of the black matrix 220 and the color filter 230 may be more difficult to perform than an etching process for forming the contact holes of the passivation layers 180 and 185. Thus, when the black matrix 220 or color filter 230 is etched, the black matrix 220 or the color filter 230 may be previously removed from the positions where the contact holes 186a, 186b, and 186c are formed.

Depending on exemplary embodiments, the position of the black matrix 220 may be changed to etch only the color filter 230 and the passivation layers 180 and 185, thereby forming the contact holes 186a, 186b, and 186c.

A pixel electrode 192 including the first sub-pixel electrode 192h and the second sub-pixel electrode 192l is formed over the second passivation layer. The pixel electrode 192 may be made of a transparent conductive material such as ITO or IZO.

The first sub-pixel electrode 192h and the second sub-pixel electrode 192l are adjacent to each other in the column direction, have a rectangular shape as a whole, and include a cross-shaped stem portion including a horizontal stem portion and a vertical stem portion crossing the horizontal stem portion. Each of the first and second sub-pixel electrodes 192h and 192l is divided into four sub-regions by the horizontal stem portion and the vertical stem portion, and each of the sub-regions includes a plurality of minute branches.

The minute branches of the first and second sub-pixel electrodes 192h and 192l form an angle of 40 to 45 degrees with the gate line 121 or the horizontal stem portion. The minute branches of two sub-regions adjacent to each other may cross at right angles. The width of the minute branches may gradually increase, or the distances between the respective minute branches may differ from each other.

The first and second sub-pixel electrodes 192h and 192l are physically and electrically connected to the first and second drain electrodes 175a and 175b through the contact holes 186a and 186b, and receive a data voltage from the first and second drain electrodes 175a and 175b, respectively.

A connecting member 194 electrically connects the extension 175c' of the third drain electrode 175c and the protrusion 134 of the storage voltage line 131 through the third contact hole 186c. As a result, a part of the data voltage applied to the second drain electrode 175b is divided through the third source electrode 173c. Thus, a voltage applied to the second sub-pixel electrode 192l may be lower than a voltage applied to the first sub-pixel electrode 192h.

The area of the second sub-pixel electrode 192l may be equal to or greater than that of the first sub-pixel electrode 192h. The area of the second sub-pixel electrode 192l may be less than two times of the area of the first sub-pixel electrode 192h.

The second passivation layer 185 may have an opening capable of collecting gas emitted from the color filter 230, and a lid made of the same material as the pixel electrode 192 and covering the opening. The opening and the lid correspond to a structure for blocking the gas emitted from the color filter 230 from being transferred to other elements, and may be omitted.

A lower alignment layer (not illustrated) is formed over the second passivation layer 185 and the pixel electrode 192.

A microcavity is positioned over the pixel electrode 192 and the lower alignment layer, and a liquid crystal layer 3 is formed in the microcavity.

The top surface of the microcavity has a horizontal plane, and the side surfaces of the microcavity have a tapered structure. As a result, the top surface of the liquid crystal layer 3 of each display pixel PX has a horizontal plane, and the side surfaces of the liquid crystal layer 3 have a tapered structure. The microcavity is formed when the sacrifice layer is removed. An upper alignment layer (not illustrated) is positioned on the top and side surfaces of the microcavity.

A plurality of microcavities are formed to be separated from each other around a region where a liquid crystal injection hole is to be formed (hereinafter, referred to as "liquid crystal injection hole formation region 307). The liquid crystal injection hole formation region 307 is formed in a direction parallel to the gate line 121, and thus the extension direction of the common electrode coincides with the extension direction of the gate line 121.

The front and rear surfaces of the microcavity have an open structure in which liquid crystal injection holes are to be formed.

The liquid crystal layer 3 positioned in the microcavity is also referred to as nanocrystal. The liquid crystal layer 3 to be formed in the microcavity may be injected into the microcavity through a capillary force.

A common electrode 270 is positioned over the microcavity, that is, over the liquid crystal layer 3. The common electrode 270 is formed along the curve of the top and side surfaces of the liquid crystal layer 3. As the common electrode 270 is separated around the liquid crystal injection hole formation region 307, a plurality of common electrodes 270 are formed. The plurality of common electrodes 270 are formed at predetermined intervals from each other. The liquid crystal injection hole formation region 307 is formed in a direction parallel to the gate line 121, and thus the extension direction of the common electrode 270 coincides with the extension direction of the gate line 121.

The common electrode 270 is made of a transparent conductive material such as ITO or IZO, and serves to generate an electric field with the pixel electrode 192 and control the arrangement direction of the liquid crystal molecules 310.

A support member is formed on the common electrode 270. The support member according to the exemplary embodiment of the inventive concept includes a roof layer 360 and an upper insulating layer 370. Depending on exemplary embodiments, the upper insulating layer 370 may be omitted. Depending on exemplary embodiments, a lower insulating layer made of the same material as the upper insulating layer 370 may be formed under the roof layer 360. The lower insulating layer and the upper insulating layer 370 may serve to protect the roof layer 360.

The roof layer 360 is formed on the common electrode 270. The roof layer 360 may serve to support the pixel electrode 192 and the common electrode 270 such that a microcavity is formed between the pixel electrode 192 and the common electrode 270. The roof layer 360 includes a pillar portion positioned in a space between the liquid crystal layer 3 and the top of the liquid crystal layer 3. The liquid crystal layer 3 and the microcavity are supported and maintained by the pillar portion of the roof layer 360. The roof layer 360 may be made of photoresist or various organic materials.

The upper insulating layer 370 is formed on the roof layer 360. The upper insulating layer 370 may include an inorganic insulator such as a silicon nitride (SiNx), a silicon oxide (SiOx), or a silicon oxynitride (SiOxNy).

The roof layer 360 and the upper insulating layer 370 may have the liquid crystal injection hole formation region 307 at one side thereof such that liquid crystal is injected into the microcavity. The liquid crystal injection hole formation region 307 includes a liquid crystal injection hole connected to each microcavity. The liquid crystal injection hole corresponds to an entrance through which liquid crystal is injected into the microcavity. The liquid crystal injection hole formation region 307 and the liquid crystal injection hole may also be used when the sacrifice layer for forming the microcavity is removed.

A capping layer 390 is formed over the upper insulating layer 370 so as to seal the liquid crystal injection hole formation region 307. The capping layer 390 blocks the liquid crystal injection hole formation region 307, and prevents the liquid crystal molecules 310 from leaking to the outside. The capping layer 390 may be formed across the entire region of the liquid crystal display. Depending on exemplary embodiments, the capping layer 390 may be formed only at the top of the liquid crystal injection hole formation region 307 and around the liquid crystal injection hole formation region 307. The top surface formed with the capping layer 390 may form a horizontal plane, like the bottom surface of the insulation substrate 110.

A polarizing plate (not illustrated) is positioned under the insulation substrate 110 and over the capping layer 390. The polarizing plate may include a polarization element for generating polarization of light and a TAC (tri-acetyl-cellulose) layer for securing durability. Depending on exemplary embodiments, the polarizer may include upper and lower polarizing plates of which transmission axes are perpendicular or parallel to each other.

In FIG. 11 and FIG. 12, a portion represented as the liquid crystal layer 3 is where the sacrifice layer had been positioned during a manufacturing process. As the sacrifice layer is removed, the microcavity is formed, and a liquid crystal material is injected into the microcavity so as to form the liquid crystal layer 3.

As well as the liquid crystal panel shown in FIG. 10 to FIG. 12, various non-self-emissive display panels may be used as the display panel 300 of the inventive concept.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A light unit comprising:
a light source comprising a plurality of self-illuminating elements including light emitting diodes; and
a diffuser separated from the light source at a predetermined distance, having a cylindrical structure and configured to diffuse the light from the light source,
wherein the diffuser surrounds the light source, and
wherein the light source is disposed at an axis of the cylindrical structure and is a linear light source elongated along a center of the cylindrical structure.

2. The light unit of claim 1 further comprising
at least one optical sheet disposed along an outer surface of the diffuser.

3. The light unit of claim 1, wherein
a horizontal distance from the light source to the diffuser is not uniform.

4. A light unit comprising:
a planar light source configured to emit light and having a cylindrical configuration having an empty space inside, wherein the planar light source having a cylindrical inner surface surrounding the empty space and a cylindrical outer surface, the light being emitted from both the cylindrical inner surface toward the empty space and from the cylindrical outer surface toward outside of the cylindrical light source;
a diffuser covering the cylindrical outer surface of the planar light source and configured to diffuse the light from the planar light source; and
a reflector disposed between the empty space and the cylindrical inner surface of the planar light source,
wherein the planar light source is disposed between the diffuser and the reflector.

5. The light unit of claim 4, further comprising
at least one optical sheet disposed along the cylindrical outer surface of the diffuser.

6. A display device comprising:
a display panel; and
a light unit configured to provide light to the display panel,
wherein the light unit comprises:
a light source comprising a plurality of self-illuminating elements including light emitting diodes, and
a diffuser separated from the light source at a predetermined distance, having a cylindrical structure and configured to diffuse the light from the light source,
wherein the diffuser surrounds the light source, and
wherein the light source is disposed at an axis of the cylindrical structure and is a linear light source elongated along a center of the cylindrical structure.

7. The display device of claim 6, wherein the display panel has a cylindrical configuration.

8. The display device of claim 7, further comprising at least one optical sheet disposed along an outer surface of the diffuser.

9. The display device of claim 6, wherein a horizontal distance from the light source to the diffuser is not uniform.

10. The display device of claim 6, wherein the display panel comprises a plurality of pixels, and
wherein each pixel comprises a liquid crystal layer disposed in a microcavity.

11. The display device of claim 6, further comprising an adhesive adhering the display panel and the light unit to each other.

12. A display device comprising:
a display panel; and
a light unit configured to provide light to the display panel,
wherein the light unit comprises:
a planar light source having a cylindrical configuration having an empty space inside and emitting light, wherein the cylindrical light source having a cylindrical inner surface surrounding the empty space and a cylindrical outer surface, the light being emitted from both the cylindrical inner surface toward the empty space and from the cylindrical outer surface toward outside of the planar light source;
a diffuser covering the cylindrical outer surface of the planer light source and configured to diffuse the light from the planer light source; and
a reflector disposed between the empty space and the cylindrical inner surface of the planar light source,
wherein the planar light source is disposed between the diffuser and the reflector.

13. The display device of claim 12, wherein the display panel has a cylindrical configuration.

14. The display device of claim 12, further comprising at least one optical sheet disposed along an outer surface of the diffuser.

15. The display device of claim 12, wherein the display panel comprises a plurality of pixels, and
wherein each pixel comprises a liquid crystal layer disposed in a microcavity.

16. The display device of claim 12, further comprising an adhesive adhering the display panel and the light unit.

* * * * *